United States Patent Office 3,328,457
Patented June 27, 1967

3,328,457
CARBAMOYLOXIME
Linwood K. Payne, Jr., Charleston, W. Va., assignor to Union Carbide Corporation, a corporation of New York
No Drawing. Filed Dec. 14, 1964, Ser. No. 418,338
1 Claim. (Cl. 260—464)

The present invention is directed to the novel carbamoyloxime, exo-3-chloro-endo-6-cyano-2-norbornanone O-(methylcarbamoyl)oxime per se, to an isomeric mixture of chlorocyanonorbornanone O-(methylcarbamoyl) oximes wherein exo - 3-chloro-endo-6-cyano-2-norbornanone O-(methylcarbamoyl)oxime is the major component, to miticidal compositions containing said carbamoyloxime, and to a method for preparing and using said carbamoyloxime.

The novel carbamoyloxime of this invention corresponds to the formula:

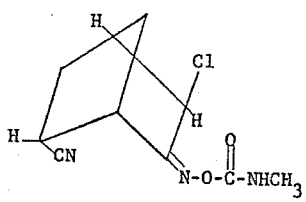

with a ring position assignment as follows:

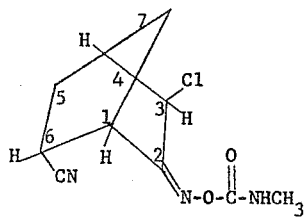

The structure of the carbamoyloxime disclosed herein was determined to be exo-3-chloro-endo-6-cyano-2-norbornanone O-(methylcarbamoyl)oxime based upon knowledge of the synthetic method employed for its preparation, the studied sterochemistry for the addition of nitrosyl chloride to the norbornene ring system, and, in particular, to extensive Nuclear Magnetic Resonance (NMR) studies carried out according to known NMR procedures on the subject carbamoyloxime and other carbamoyloximes, as well as related compounds.

The following is given as proof of the assigned configuration of exo - 3-chloro-endo-6-cyano-2-norbornanone O-(methylcarbamoyl)oxime to the carbamoyloxime of this invention:

POSITION AND CONFIGURATION OF THE CHLORINE ATOM

The chlorine is exo as indicated by the established cis, exo mode of addition of nitrosyl chloride to the norbornene system [J. Am. Chem. Soc., 85 2513 (1963)]. More conclusively, the hydrogen at $C_3$ appears as a doublet at 4.47 p.p.m. in the NMR spectrum. The lines of the doublet are separated by about 2, 3 cps. which is characteristic for the endo configuration of the proton. Therefore the chlorine at $C_3$ must be exo. When the hydrogen is exo, the dihedral angle with vicinal bridgehead hydrogen is such that the spin-spin coupling constant is 4–5 cps. [Can. J. Chem., 39 789 (1961) and J. Chem. Phys., 30 11 (1959)]. All NMR studies were carried out according to known procedures. The NMR studies were performed on a Varian 60 mc. spectrometer in deuterochloroform. Chemical shifts were measured in parts per million and tetramethyl silane was used as an internal standard.

Since the pattern consists of a simple doublet the other vicinal carbon has no hydrogen atoms. This then places the chlorine adjacent to the oximino function.

POSITION AND CONFIGURATION OF THE CYANO GROUP

The endo configuration has been assigned to the cyano group since pure 5-norbornene-endo-2-carbonitrile was used as a starting material. Epimerization of the cyano group can be induced with strong bases [J. Am. Chem. Soc., 80 5488 (1958)], but no such reagent was employed in the reaction sequence to exo-3-chloro-endo-6-cyano-2-norbornanone O-(methylcarbamoyl)oxime. Further confirmation of the geometry is obtained from the NMR spectrum. The proton attached to the carbon bearing the cyano group, $C_6$, gives a signal centered at about 3.15 p.p.m. which consists of five lines. The multiplet appears to be two overlapping triplets with about 4 cps. splittings. These large coupling constants are the results of about an 8 cycle coupling constant of an exo-hydrogen at $C_6$ with the exo-hydrogen at $C_5$. This is then further split by a 2–3 cycle coupling with the endo-hydrogen at $C_5$ and a 4–5 cycle coupling with the bridgehead proton at $C_1$ [Can. J. Chem. 39, 789 (1961)]. If the proton at $C_6$ were endo, coupling with the bridgehead proton at $C_1$ would be zero [Can. J. Chem. 39, 789 (1961)].

The position of the cyano group at $C_6$ can also be ascertained from the NMR spectrum. The bridgehead hydrogen atoms appear at 2.7 p.p.m. and 4.0 p.p.m. The normal signals for the bridgehead hydrogens in norbornane (A) occur at 2.2 p.p.m..

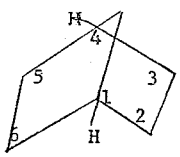

(A)

$H_1$ at 2.2 ppm
$H_4$ at 2.2 ppm

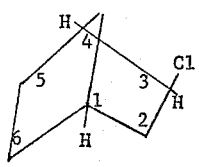

(B)

$H_1$ at 2.3 ppm
$H_4$ at 2.4 ppm

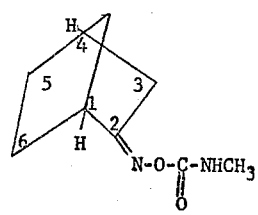

(C)

$H_1$ at 3.1 ppm
$H_4$ at 2.3 ppm

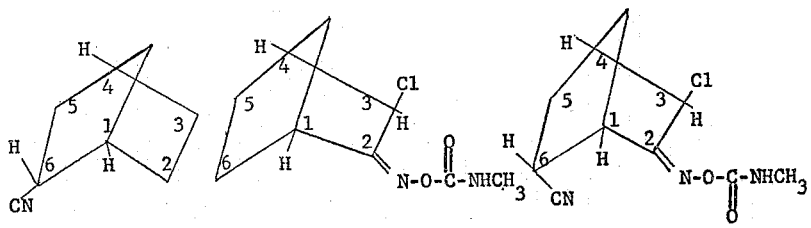

(D)  (E)  (F)

H₁ at 2.6 ppm    H₁ at 3.1 ppm    H₁ at 4.0 ppm

H₄ at 2.4 ppm    H₄ at 2.6 ppm    H₄ at 2.7 ppm

The vicinal bridgehead proton, H₄, in exo-2-chloronorbornane (B) is shifted downfield to 2.4 p.p.m. Norbornanone O-(methylcarbamoyl)oxime (C) gives a signal for the bridgehead proton adjacent to the oxime function H₁, at 3.1 p.p.m. and for the distant bridgehead proton, H₄, at 2.3 p.p.m. The strong paramagnetic shift of H₁ is due to the inductive and anisotropic effects of the hydroxyimino group.

Endo-2-cyanonorbornane (D) gives a signal for the bridgehead hydrogen atom adjacent to the cyano group, H₁, at 2.6 p.p.m. and the more distant bridgehead proton, H₄, at 2.4 p.p.m.

In the case of exo-3-chloro-2-norboranone O-(methylcarbamoyl)oxime (E), the bridgehead proton, H₁, vicinal to the oxime grouping gives a response at 3.1 p.p.m., while the bridgehead adjacent to the chlorine, H₄, gives a signal at 2.6 p.p.m.

With this information it became obvious that the strong paramagnetic shift of the bridgehead hydrogen atom in exo-3-chloro - endo-6-cyano-2-norbornanone O - (methylcarbamoyl)oxime (F) to 4.0 p.p.m. is a result of this proton being located between the cyano group and the hydroxyimino function. Therefore the cyano group must be at C₆, the O-(methylcarabamoyl)oximino group at C₂ and the chlorine at C₃. The signal for the bridgehead proton adjacent to the chlorine occurs at 2.7 p.p.m. as it does in related compounds [J. Org. Chem., 26, 4905 (1961)].

All NMR studies were performed according to known procedures.

The carbamoyloxime of this invention may be prepared as illustrated by reaction scheme (A):

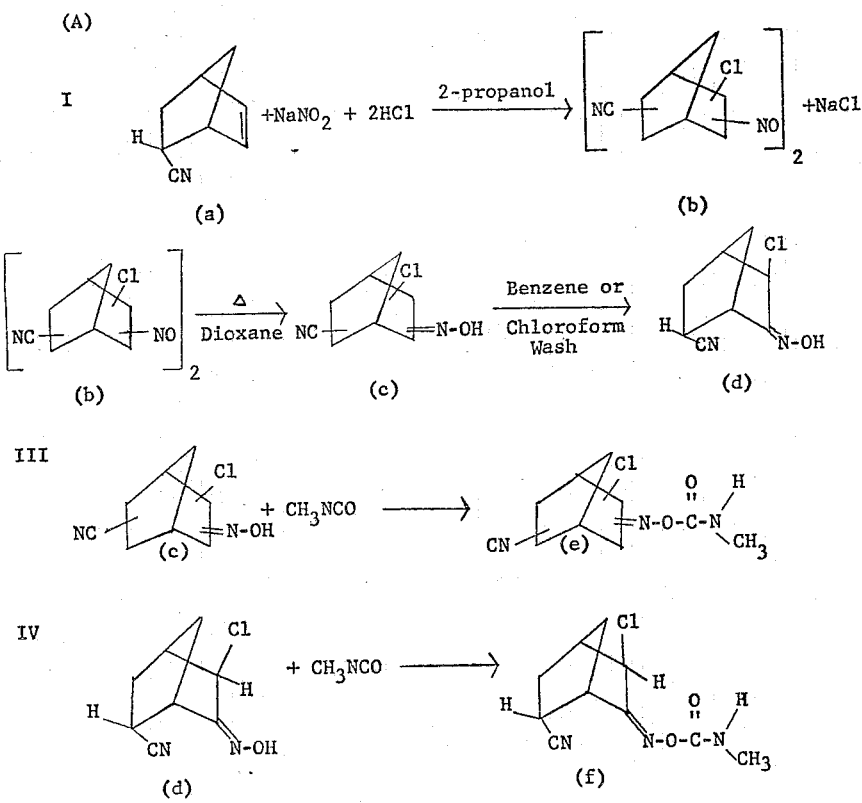

In reaction scheme (A), 5-norbornene-endo-2-carbonitrile (a) was obtained, free from 5-norbornene-exo-2-carbonitrile ene, by careful distillation through an efficient column of the mixture of exo and endo isomers obtained by the reaction of acrylonitrile with cyclopentadiene [K. Alder, K. Heimback and R. Renke, Ber. 91, 156 (1958)]. Synthesis of the nitrosochloride dimer (b) proceeded smoothly when the reaction temperature was maintained near 0° C. The nitrosochloride dimer (b) was obtained as a slurry in a hydrochloric acid/2-propanol medium. Other alkanols, such as ethanol or methanol, may be used in this reaction in place of 2-propanol. The nitrosochloride dimer (b) was washed thoroughly with water to remove the by-product sodium chloride and collected by filtration.

The nitrosochloride dimer (b) was rearranged to the isomeric chlorocyanooximes (c) by heating a 10% slurry of the nitrosochloride dimer (b) in dioxane at 98° C. Other solvents such as 1-butanol, 2-butanol, acetonitrile, N,N-dimethylformamide, 2-propanol, ethyl Cellosolve acetate and 1,1,2-trichloroethane can also be used in this rearrangement in place of dioxane. Benzylamine (0.03%) can be added to the dioxane to accelerate the arrangement. It is believed that benzylamine acts as a metal scavenger. The time required for the nitrosochloride dimer (b) to dissolve in the dioxane was reduced to one-tenth in the presence of benzylamine when compared to the same reaction in the absence of benzylamine. Other primary amines in addition to benzylamine may be used to aid in the rearrangement.

When the chlorocyanooximes (c) had formed the dioxane solvent was stripped from the reaction mixture under reduced pressure. In order to obtain a high yield of the desirable benzene-insoluble chlorocyanooxime (d), it was necessary to remove the dioxane rapidly at a temperature of 35° C. or below. Studies indicate the prolonged heating of the chlorocyanooxime (d) in dioxane solution results in a larger proportion of more soluble isomers. Complete removal of the dioxane was effected by using xylene as a chaser. The resulting solid isomeric chlorocyanooximes (c) were collected by filtration of the xylene slurry.

The isomeric chlorocyanooximes (c) were slurried in one and one-half to three times their weight of methyl isocyanate and stirred at 43° C. for three hours under nitrogen. Evaporation of the excess methyl isocyanate under slightly reduced pressure resulted in a high yield of the O-(methylcarbamoyl)oximes (e).

Exo-3-chloro-endo-6-cyano-2-norbornanone oxime (d) was obtained as an insoluble solid from the isomeric mixture of chlorocyanooximes (c) by thoroughly washing with benzene or chloroform. When allowed to react with methyl isocyanate, preferably in excess methyl isocyanate, also a suitable solvent such as anhydrous acetone may be employed, exo - 3 - chloro - endo-6-cyano-2-nobornanone O-(methylcarbamoyl)oxime (f) is obtained in high yield.

The following preparations more specifically illustrate the preparation of the starting materials and/or intermediates used to prepare the carbamoyloxime of this invention.

*Preparation 1.—5-norbornene-endo-2-carbonitrile (a)*

5-norbornene-endo-2-carbonitrile was prepared by a conventional route as described for example, in J. Gen. Chem. (U.S.S.R.), 32, No. 9, 2942–2951 (1962).

*Preparation 2.—5-norbornene-endo-2-carbonitrile nitrosochloride dimer (b)*

To a well-cooled solution of 120-ml. (1.44 mole) of concentrated hydrochloride acid and 120 ml. of isopropyl alcohol was added 35.7 g. (0.3 mole) of 5-norbornene-endo-2-carbonitrile. The solution was stirred at −5° C. while 23 g. (0.333 mole) of sodium nitrite in 50 ml. of water was added dropwise over a twenty-minute period. The resulting slurry was stirred at −5° C. for an additional hour, diluted with an approximately equal volume of water and filtered. The precipitate was transferred to a beaker and stirred with 250 ml. of water and again filtered. The process of washing was repeated twice and the precipitate finally washed with a small amount of cold (−20° C.) methanol and allowed to dry in vacuo. The resulting nitrosochloride dimer was a white powder with a slight green-blue tinge. It weighed 52 g. (94% yield based on olefin charged) and melted with decomposition at 170–173° C. when heated at 10° C. per minute in a block preheated to 150° C.

*Analysis.*—Calc'd. for $C_8H_9ClN_2O$: C, 52.0; H, 4.9; N, 15.2. Found: C, 51.7; H, 5.1; N, 15.0.

Reaction of the same olefin in diethyl ether or pentane solution with nitrosyl chloride results in a 94–95% yield of nitrosochloride dimer melting with decomposition at 159–163° C. when reacted in diethyl ether and at 156–160° C. when reacted in pentane. These melting ranges are indicative of a differing distribution of structural isomers (i.e. more random) than when the alcohol-acid reaction medium is used.

*Preparation 3.—Chlorocyanonorbornanone oximes (c)*

To a 1–L flask containing 540 ml. of dioxane and 150 mg. of benzylamine was added 60 g. of 5-norbornene-endo-2-carbonitrile nitrosochloride dimer. The slurry was stirred and heated rapidly to 98° C. The solid dissolved in twenty-five minutes to give a green solution. This solution was stirred at 98° C. for an additional hour during which the solution turned yellow. The dioxane was then stripped from the product rapidly under reduced pressure. A 45° C. water bath was employed to supply heat to the kettle. The last traces of dioxane were removed from the product by chasing with 500 ml. of xylene and collecting about 300 ml. of distillate. During this rapid distillation the kettle temperature was not allowed to exceed 35° C.

The xylene slurry was filtered and the solid washed thoroughly with xylene. There was obtained 55 g. (92%) of oxime; M.P. 134–151° C.

*Analysis.*—Calc'd for $C_8H_9ClN_2O$: C, 52.0; H, 4.9; N, 15.2. Found: C, 51.8; H, 5.0; N, 15.0.

Infrared: —NO—H at 3.07μ, C≡N at 4.40μ, and C=N—O at 10.35μ.

*Preparation 4.—exo-3-chloro-endo-6-cyano-2-norbornanone oxime (d)*

5-norbornene-endo-2-carbonitrile nitrosochloride dimer (15 g.) was slurried in dioxane (135 g.) and heated rapidly to 95–98° C. while stirring. The solid dissolved in one and one-half hours to give a green solution. The solution turned yellow after heating for an additional one-half hour. After a total heating period of four hours the light brown to orange solution was subjected to vacuum distillation from a 40° C. water bath. The solid which resulted after the removal of all of the dioxane was washed with benzene and allowed to air dry. There was obtained 12 g. (80% yield) of a white solid M.P. 169–171° C.

*Analysis.*—Calc'd. for $C_8H_9ClN_2O$: C, 52.0; H, 4.9; N, 15.2. Found: C, 51.9; H, 5.0; N, 15.1.

The infrared spectrum confirmed the proposed chlorooxime structure with strong oxime absorption bands at 3.07μ and 10.4μ.

*Example 1.—exo-3-chloro-endo-6-cyano-2-norbornanone O-(methylcarbamoyl)oxime (f)*

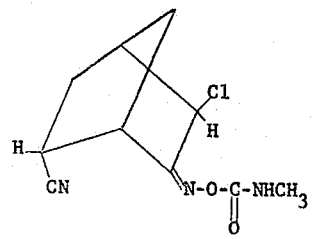

One part of exo-3-chloro-endo-6-cyano-2-norbornanone oxime (d) was allowed to react with four parts of methyl isocyanate at 40° C. for four hours in a pressure bottle. The excess methyl isocyanate was stripped from the product under reduced pressure and the residue recrystallized from isopropyl alcohol. Exo-3-chloro-endo-6-cyano-2-norbornanone O-(methylcarbamoyl)oxime was obtained in 95% yield. A small sample was treated with decolorizing charcoal and recrysfallized twice from ethanol. After drying, the resulting white needles melted at 159–160° C.

*Analysis.*—Calc'd. for $C_{10}H_{12}ClN_3O_2$: C, 49.7; H, 5.0; N, 17.4. Found: C, 49.7; H, 4.9; N, 17.2.

Infrared:: N—H at 3.02μ and 6.63μ; C≡N at 4.48μ; C=O at 5.85μ; C—O at 7.95μ and C=N—O— at 10.45μ.

*Example II.—Isomeric chlorocyanonorbornanone O-(methylcarbamoyl)oximes (e)*

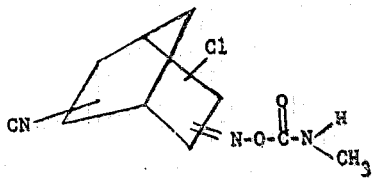

One part of isomeric chlorocyanorbornane oximes (c), obtained by the rearrangement of 5-norbornene-endo-2-carbonitrile nitrosochloride dimer, was dissolved in four parts of methyl isocyanate and allowed to react at 40° C. for four hours in a pressure bottle. The excess methyl isocyanate was stripped from the reaction product under reduced pressure and the residue held at 25° C. under 3 mm. pressure for two hours. The resulting solid was stirred with cyclohexane, filtered and washed thoroughly with cyclohexane. After drying at 36° C./2 mm. for sixteen hours the product (e) melted at 56–120° C. The yield was 98.5%. The compound was 99% pure by infrared analysis using exo-3-chloro-endo-6-cyano-2-norbornanone O-(methylcarbamoyl)oxime (f) (M.P. 159–160° C.) as a standard and measuring the optical density of the carbonyl band at 5.85μ. Analysis by nuclear magnetic resonance indicated that the product contained 80% exo-3-chloro - endo - 6 - cyano - norbornanone O-(methylcarbamoyl)-oxime (f). There is evidence to indicate that this isomeric mixture contains significant amounts of an isomer in which the hydroxyimino function is on the bridge methylene (7 position) and the chlorine and cyano groups are on opposite sides of the methylene bridge. The O-(methylcarbamoyl)oxime impurity has been isolated and the NMR spectrum obtained.

The carbamoyloxime of the present invention has shown marked miticidal activity. It has been shown that the isolated and pure crystalline isomer of this invention, i.e. exo-3-chloro-endo-6-cyano - 2 - norbornanone O-(methylcarbamoyl)oxime ((f), compound (4) in Table I), has exceptional miticidal properties compared to the other miticides shown in Table I, as follows:

TABLE I.—MITICIDE ACTIVITIES

| Compound: | $LD_{50}$ (p.p.m.) Two-Spotted Mite (*Tetranychus tetarium* (L)) |
|---|---|
| (1) Isomeric chlorocyano-norbornanone O-(methylcarbamoyl)oximes from 5-norbornene-exo-2-carbonitrile nitrosochloride dimer | 120 |
| (2) Isomeric chlorocyano-norbornanone O-(methylcarbamoyl)oximes from nitrosochloride dimer of a natural mixture of endo and exo 5-norbornene-2-carbonitriles | 68 |
| (3) Isomeric chlorocyano-norbornanone O-(methylcarbamoyl)oximes (e) from 5-norbornene-endo-2-carbonitrile nitrosochloride dimer | 20 |
| (4) exo-3-chloro - endo-6-cyano-2-norboranone O-(methylcarbamoyl) oxime (f) | 12 |

The crystalline chlorocyanonorbornanone O-(methylcarbamoyl)oximes obtained from 5-norbornene-exo-2-carbonitrile nitrosochloride dimer by rearrangement to the chlorocyanonorbornanone oxime and subsequently reacting with methyl isocyanate are compounds (1), Table I. The crude chlorocyanonorbornanone O-(methylcarbamoyl)-oximes obtained from the nitrosochloride dimer of the natural mixture of endo and exo 5-norbornene-2-carbonitrile [K. Alder, K. Heimback and R. Reuke, Ber. 91, 156 (1958) for synthesis of this cyanoolefin] by rearrangement to the isomeric mixture of chlorocyano oximes and reacting with methyl isocyanate are compounds (2), Table I. The crystalline chlorocyanonorbornanone O-(methylcarbamoyl)oxime isomers (compound e in reaction Scheme A) obtained from 5-norbornene-endo-2-carbonitrile nitrosochloride dimer by rearrangement to isomeric chlorocyanonorbornanone oximes and reaction with methyl isocyanate are compounds (3), Table I.

The chlorocyanonorbornanone O-(methylcarbamoyl) obtained from 5-norbornene-endo-2-carbonitrile nitrosochloride dimer by rearrangement to the isomeric chlorocyanonorbornanone oximes and reaction with methyl isocyanate [compounds e and f in Scheme A and compounds (3) and (4) in Table I] are six to ten times more effective against the two-spotted mite than the crystalline isomeric mixture of chlorocyanonorbornanone O-(methylcarbamoyl)-oximes obtained 5-norbornene-exo-2-carbonitrile nitrosochloride dimer by the same procedure [compounds (1) in Table I], and 3 to 5, and possibly more, times more effective as a miticide than the isomeric mixture of chlorocyanonnorbornanone O-(methylcarbamoyl)-oximes obtained from the nitrosochloride dimer of the natural mixture of endo and exo 5-norbornene-2-carbonitrile (approximately 60% endo and 40% exo) by the same procedure [compounds (2) in Table I].

The tests recorded in Table I were carried out as follows:

MITE FOLIAGE SPRAY TEST

*Test organism.*—Adults and nymph stages of the two-spotted mite (*Tetranychus telarium* L.), reared on Tendergreen bean plants at 80±5° F. and 50± 5 percent relative humidity, were the test organisms. Infested leaves from a stock culture were placed on the primary leaves of two bean plants six to eight inches in height, growing in a two and a half inch clay pot. 150–200 mites, a sufficient number for testing, transferred from the excised leaves to the fresh plants in a period of twenty-four hours. Following the twenty-four hour transfer period, the excised leaves were removed from the infested plants.

*Concentration of toxicant.*—The test compounds were formulated by diluting a stock suspension with water to give a suspension containing varying desired concentrations (in parts per million). This procedure is conventional and commonly called serial dilution.

*Application of toxicant.*—The potted plants (one pot per compound) were placed on a revolving turntable and sprayed with 100–110 milliliters of test compound formulation by use of a DeVilbis spray gun set at 40 p.s.i.g. air pressure. This application, which lasted 30 seconds, was sufficient to wet the plants to run-off. As a control, 100–110 milliliters of a water solution containing acetone and emulsifier in the same concentrations as the test compound formulation, but containing no test compound, were also sprayed on infested plants.

*Holding conditions.*—The sprayed plants were held at 80±5° F. and 50±5 percent relative humidity for four days, after which a mortality count of motile forms was made.

*Record of results.*—Microscopic examination for motile forms was made on the leaves of the test plants. Any individual which was capable of locomotion upon prodding was considered living. Each compound was then rated according to the concentration, in parts per million, which will result in killing fifty percent of the test organisms. This is defined as the $LD_{50}$ value.

The compound of the instant invention can be applied to plants or other areas to be protected by contacting such area with the instant compound in an undiluted form, as a dust when admixed with finely powdered inert carriers, or in a liquid form. The rate of application can vary from about 0.25 to about 5 pounds or more of the compound per acre. The compound is measurably active at from at least 0.10 pound per acre, preferred rate is from at least about 0.75 lb./acre to 3 lb./acre, with the upper limit determined chiefly by economic and phytotoxicity considerations.

When the compound of the instant invention is applied as dusts they can be mixed with suitable particulate extenders, such as clay, chalk, talc, diatomaceous earth, pyrophyllite, infusorial earth, fuller's earth, pumice, bentonite, and flours, such as cotton seed flour and walnut shell flour.

The application of the instant compound in a liquid medium can be accomplished in any of several ways. For example, the compound can be directly dispersed in a liquid carrier such as water, petroleum distillates and the like with or without the use of surface active agents.

Another method of preparation of liquid compositions containing the compound of this invention is to first prepare a liquid concentrate containing the compound by dissolving the compound in a suitable solvent such as acetone, isophorone, chloroform, nitrobenzene, for example. This liquid concentrate can then be added to water together with suitable surface active dispersing agents whereby the compound is dispersed in the water.

A third method of preparing liquid compositions containing the compound of this invention is to prepare a wettable powder by dispersing the compound on or in a finely divided inert solid such as clay, talc, chalk, bentonite, fuller's earth and the like. These compositions may also contain dispersing or wetting agents as desired. These compositions can then be mixed with water to provide a liquid insecticide suitable for application to the areas to be treated. The compound of this invention can also be successfully applied as a conventional granular formulation.

The surface active agents that can be employed in the above-described compositions can be any of the known anionic, cationic and non-ionic wetting, emulsifying and dispersing agents, such as aralkyl polyether alcohols, aralkyl polyether sulfonates, aralkyl polyether sulfates, quarternary ammonium compounds, and the like. When these surface active agents are employed they generally comprise from about 0.5 percent to about 5 percent by weight of the total composition.

What is claimed is:

Exo - 3-chloro-endo-6-cyano-2-norbornanone O-(methylcarbamoyl)oxime corresponding to the formula

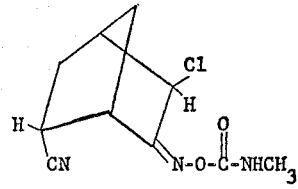

No references cited.

CHARLES B. PARKER, *Primary Examiner.*
JOSEPH P. BRUST, *Examiner.*